March 9, 1937.                R. F. ENSIGN                 2,073,299
                        GAS CARBURETING APPARATUS
                          Filed May 20, 1933
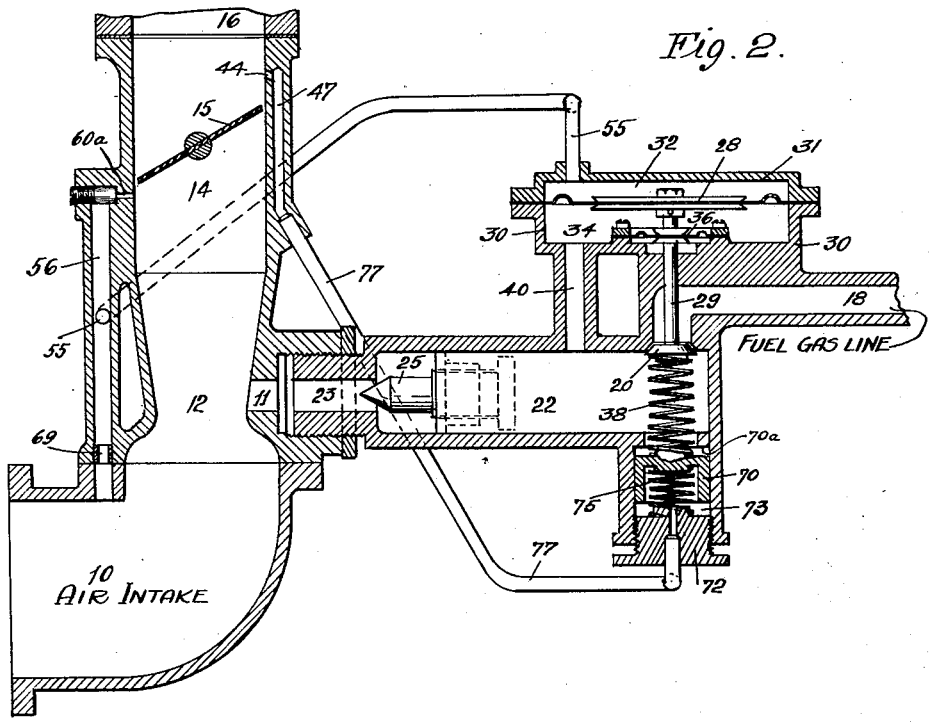
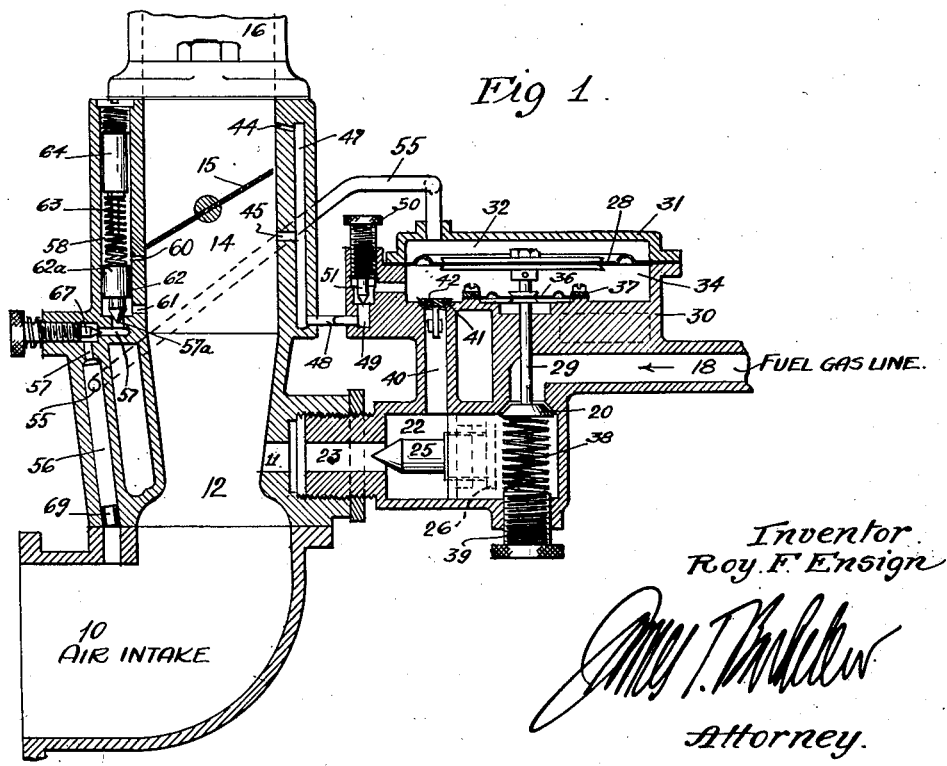
Inventor.
Roy F. Ensign
Attorney.

Patented Mar. 9, 1937

2,073,299

UNITED STATES PATENT OFFICE 2,073,299

GAS CARBURETING APPARATUS

Roy F. Ensign, San Marino, Calif., assignor to Ensign Carburetor Co., Ltd., Huntington Park, Calif., a corporation of California Application May 20, 1933, Serial No. 671,979

17 Claims. (Cl. 48—184)

This invention relates generally to a gas feed system for internal combustion engines; and a general object is to provide, in combination with a carbureter, a system of control and regulation for the feed of gaseous fuel thereto.

For many reasons it is not satisfactory merely to provide a pressure reducing valve or regulator to introduce gaseous fuel from a supply source to the fuel intake of a carbureter. Among such reasons are to be noted the inflexibility of such a system to suit the varying requirements of changing engine operations; and also particularly that there is no means provided in such a system for automatically cutting off the feed of gas when engine operation ceases.

It is a general object of my invention to provide a system of control and regulation wherein such automatic gas feed cut-off is accomplished, and wherein also the action of the pressure regulator is automatically modified to suit varying and different requirements of the engine.

In accomplishing these and other objects which will hereinafter appear, my system of control and regulation provides that the pressure regulator, when unaffected by modifying influences from engine operation, will deliver at its outlet side a pressure preferably slightly sub-atmospheric; so that the regulator will automatically shut off the gas supply when the pressure at its outlet side builds up to atmospheric when the engine ceases to draw gas from the outlet. For the purposes of this description I use the expression "normal", as applied to the outlet pressure of the regulator, to mean that pressure which the regulator would normally deliver without being modified in its action by virtue of engine operation. Then, by virtue of engine operation, my system provides that the regulator shall be so modified in its action as, when the engine is running, to cause gas delivery at such pressure that the carbureter will always, throughout the range of engine operation, be able to draw its requirements of fuel and, further, may be supplied with that fuel under varying modified pressures that result in giving the engine the varying mixture proportions desirable for different ranges of operation, such as idling, and medium range operation at economy.

How these and other objects are accomplished will be better understood by reference to the following specification and the accompanying drawing in which:

Fig. 1 is a vertical median section of a carbureter and feed system in accordance with one form of my invention, and Fig. 2 is a similar view in accordance with another form of my invention.

In the typical form of carbureter here shown, the main air intake is at 10, leading to the suction passage containing the Venturi throat 12 where the gaseous fuel is introduced through the port 11 at a point of high air velocity. It will be understood that the Venturi formation is used only for the purpose of attaining high velocity and consequent low pressure in the air stream. Any other arrangement accomplishing the low pressure result, so that the gaseous fuel may be drawn in, is sufficient and is the equivalent for the purposes of this invention. The mixture then continues on through section 14 of the suction passage, past throttle valve 15 to the engine intake manifold 16. Gaseous fuel may be supplied from any suitable source and at any suitable pressure; in commercial practice gas will probably be supplied from the usual service mains or from pressure tanks or bottles, which will supply to the initial intake passage 18 a pressure above atmospheric. This pressure, whatever it may be, will be termed the initial high pressure. Controlled and regulated by the pressure regulating valve 20 the gaseous fuel enters the outlet chamber 22 where a relatively low pressure is maintained; thence this low pressure gas passes the adjustable needle valve 25 and goes through passage 23 to the gas inlet port 11 at the throat of the venturi.

The pressure regulating valve 20 is automatically controlled by a diaphragm 28 connected to the upper end of valve stem 29. Diaphragm 28 is clamped at its periphery between the regulator body 30 and cap 31, to form an upper pressure chamber 32 above the diaphragm and a lower pressure chamber 34 beneath the diaphragm. To seal against leakage around the valve stem, a small diaphragm 36 is secured to the valve stem and to the regulator body 30 beneath gasket 37. Pressing upwardly on valve 20 and tending to seat it, is a compression spring 38, whose compression is regulated and adjusted by a screw-threaded plug 39. It will readily be understood that the adjustment of compression spring 38 is the means by which the desired differential between the high pressure in 18 and the low pressure in 22 is attained.

A communicating passage 40 connects between outlet passage 22 and chamber 34 to communicate the regulated low pressure to the under side of the diaphragm. The upper end of passage 40 is closed by a small downwardly seating valve 41, which seats by gravity; the valve being provided with a small leak port 42, so that at all times there is at least a small communication between chamber 22 and chamber 34.

Pressure chamber 34, in the form of the invention illustrated in Figure 1, is placed in communication with the main suction passage 14 above throttle 15, by means of a system of passages which will be termed the operating control. As shown in this figure this operating control comprises passage 47 communicating with the main suction passage through a port 44 above the throttle and a port 45 below the throttle. Passage 47 communicates, via tube 48, with a passage 49 which is adjustably controlled by needle valve 50, 51. The purpose and operation of this operating control is to place effectively upon chamber 34 a certain fractional portion of the depression existing above throttle 15, when the engine is in operation. Because only a fraction of the initial available depression is necessary, the depression at port 44 is, as shown in Figure 1, reduced or bled off by the entry of air at 45, and further controllably reduced by adjustment of needle valve 51. It will be noted that the pressure existing in chamber 34 is a pressure tending to close the regulator valve 20. This pressure, depending as it does primarily upon the outlet pressure from the regulator, is a variable one; and is also variable because of the action of the operating control, as will be hereinafter described.

Opposing these variable forces tending to close the regulator valve are certain other forces including a reference pressure or force which tends at all times to open the regulator valve. Substantially speaking this reference pressure or force may be or is any fixed quantity; but, considering the fact that the carbureter of the system operates with air from atmosphere, it is desirable to use atmospheric pressure as the reference pressure, and further to use that atmospheric pressure which occurs at the air intake 10. Thus, the upper diaphragm chamber 32 is connected via balance tube 55 with a passage 56 which, calibrated by the bushing 69 with a bore of predetermined size, communicates with the atmosphere at the main air intake 10. Thus, the diaphragm chamber 32 is connected with atmosphere, but is connected with the atmosphere in such a manner that, if air cleaners or heaters are applied to air intake 10, the same effective reduction of pressure which is imposed upon the carbureter will also be imposed upon chamber 32. Thus the system will always operate in balance.

Also communicating with diaphragm chamber 32 is a system of control or regulation which I may call the economizer system. Although this system operates independently of the balance system, it may be conveniently connected to chamber 32 also through the tube 55. Thus I show, communicating with passage 56, passage 57 controllable by the adjustable needle valve 67 and having a port 57a leading into the bore 58 which is in communication with the main suction passage through ports 60 and 61. Sliding in bore 58 is a needle valve 62, normally tending, under the force of gravity and spring 63, to seat on port 57a and thus cut off communication between port 61 and passage 57. The needle valve 62 has the enlarged part 62a snugly but slidably fitting in bore 58, and of such length as not to close port 61 when in its lower position and not to close port 60 when raised high enough to fully open port 57a. Spring pressure against valve 62 is adjusted by means of the screw-threaded member 64.

A typical structure and arrangement having now been described, the operation and interacting functions of the various parts will now be set forth. The normal action of the regulator itself will be readily understood without any length of additional description. Assuming the high pressure in 18 to be fairly constant, the normal action of the regulator, unmodified by the actions and functions hereinafter described, will be to deliver gas into outlet chamber 22 at a substantially constant low pressure; the differential between the reference pressure in diaphragm chamber 32 and the low pressure in outlet chamber 22 being regulated by adjustment of spring 38. In the preferred operation of my system spring 38 is adjusted so that the normal outlet pressure of the regulator is slightly sub-atmospheric; sufficiently below atmosphere that, whenever atmospheric pressure is present in chambers 22 and 34, regulator valve 20 will be positively and tightly closed. Thus, when the engine is not in operation and atmospheric pressure is present in Venturi throat 12, the regulator under these conditions of adjustment will automatically close and prevent any gas leakage.

As soon as the engine (not shown) is started, and whenever the engine is in operation, the manifold depression which exists above throttle 15 is communicated via the operating control to diaphragm chamber 34; and the existence of this depression, tending as it does to reduce what would otherwise be the normal outlet pressure existing in chamber 34, tends to lower the diaphragm and open valve 20 and thus to raise the pressure in outlet chamber 22. The modification of regulator operation thus caused by the application of this depression in chamber 34 is designed, at least when the depression at port 44 is its maximum, to raise the outlet pressure in 22 to something about or somewhat above atmospheric, so that the very slight depression occurring at Venturi throat 12 when the engine is idling will still cause sufficient flow of gaseous fuel into the air stream to satisfy the engine requirements. There are several various manners in which the operating control member may function; but all include the general function of raising the regulator outlet pressure while the engine is operating.

It will be understood that the depression existing at port 44 above the throttle is, in general, greatest when throttle 15 is closed. The depression at that point also depends upon engine speed, and, in general, is least when the throttle is wide open and the engine operating slowly under heavy load. Now, the operating control may be so adjusted that, even when the depression at 44 is the least, a sufficient depression will still be applied to diaphragm chamber 34 to substantially modify and raise the outlet pressure in 22. Such action may be accomplished for instance by making port 45 small in relation to port 44, (although in the particular form of the invention shown in the drawing, port 45 is shown to be the larger) or by eliminating port 45 altogether, or by more or less opening valve 51. Under such conditions of operation, when the throttle 15 is somewhat closed down, or the engine is operating at higher speed, the depression applied to chamber 34 increases, being its greatest when throttle 15 is closed down to idling. Under these conditions the weight of valve 41 limits the amount of depression which may be effectively applied to chamber 34; the valve rises when the limiting depression is reached; and thus the weight of valve 41 is the main determining factor in the determination of how much the outlet pressure in 22 is raised above the "normal" sub-atmospheric pressure which the regulator otherwise delivers. The weight of valve 41 is made such as to raise the pressure in 22 sufficiently to cause adequate gas flow to Venturi throat 12 when the depression there is very small. Thus, in this preferred mode of operation, a substantial depression, limited in amount by the action of valve 41, is applied to chamber 34 substantially at all times when the engine is operating.

In practical operation, if the depression at port 44 is so small as to apply only a negligible modification to the regulator action when throttle 15 is wide open, the result that the outlet pressure in 22 may then be sub-atmospheric is of no consequence because the depression then existing in Venturi throat 12 is very large and capable of drawing in the gaseous fuel. In fact, the depression in throat 12, at most operating ranges is large enough to draw in a sufficient quantity of gaseous fuel even though the delivery pressure in 22 be sub-atmospheric even to the extent of the "normal" sub-atmospheric pressure which, as has been pointed out, is desirable to cause automatic closing of the regulator valve 20.

Thus my system is capable of operation in such manner that the operating modification only causes a substantial rise in pressure in 22 at times when the engine is in its lower ranges of operation, or even only when the engine is idling; and the operating control can be adjusted and modified in action to operate in any of those manners. For instance, by enlarging port 45 and by closing down valve 51, the proportionate amount of the depression at 44 which is finally applied to chamber 34 may be made so small that it may only be in the lower ranges, or even only in the idling range, that the depression in 34 is sufficient substantially to raise the outlet pressure in 22. Under these conditions of operation, the operating control may also become in effect an idling control which, acting either only, or with its greatest effect, when the throttle is closed and the engine idling, raises the pressure in 22 most when the engine is idling and thereby causes a proportionately greater amount of gas (amount of gas in proportion to the depression in 12) to be drawn into the air stream at idling to give the engine a somewhat enriched mixture at that range of operation.

In medium ranges of operation it is desirable, for reasons of economy, that an engine be fed with a relatively lean mixture. The economizer control accomplishes this purpose. As throttle valve 15 opens past the idling position it moves closely past the port 60; and the relatively high depression to which port 60 is then subjected causes needle valve 62 to rise and open port 51a; thus allowing the depression at port 61 to be applied, via port 51a, passage 57 and tube 55, to the diaphragm chamber 32 in an amount which is adjustable by the needle valve 67. This modifying depression tends, everything else being equal, to cause diaphragm 28 to rise and valve 20 to close down, and thus tends temporarily to reduce the outlet pressure at 22 and proportionately to reduce the amount of gas drawn into the Venturi throat. As the throttle is opened more and more widely, the depression at port 60 decreases and valve 62, moving downwardly, finally seats and cuts off the economizer control from the regulator. Thus, up to a predetermined point in range of engine operation, which point is more or less adjusted by the adjustment of member 64 and of valve 67, the economizer modification tends to reduce the gas pressure in 22 and thus to reduce the proportionate amount of gas going into the air stream. Beyond that predetermined point in the range of engine operation, at which point valve 62 closes, the pressure in 22 is no longer modified by this economizer modification and the carbureted mixture is kept up to normal proportions to give the engine full power. The mixture proportions at full power, and the general proportions throughout the operating range, are of course regulated by adjustment of the main fuel control needle 25.

Figure 2 shows certain modifications of my system for the purpose of indicating modified arrangements which will accomplish the same results. Here, for instance, is shown a somewhat different type of economizer control, wherein the depression which is applied to a smaller port 60a is communicated directly to passage 56 and thus to tube 55. The depression at port 60a is, as the throttle passes it, and during medium ranges of engine operation, greater than is the depression applied to port 61 of Figure 1. Consequently port 60a is smaller than port 60, and the calibrated bushing 69 which communicates passage 56 with atmosphere may also be larger; all to the general effect that substantially the same maximum amount of depression is again applied to diaphragm chamber 32. The action of this economizer system is in a general way similar to that before described excepting that here the depression applied via port 60a gradually falls off as the throttle is opened, until it becomes substantially negligible as wide open position is approached. The action in Figure 2 is thus to gradually remove the modifying depression as wide open position is approached; whereas in Figure 1 the action is more nearly to apply a fairly uniform modifying depression to chamber 32 throughout the medium ranges of engine operation, and then more or less suddenly to remove that modifying depression at some point before wide open condition is reached.

Another modification indicated in Figure 2 has to do with the mode of application of the operating control. It will be remembered that I have referred to the operating control as applying to the regulator valve a force which, during engine operation, tends to open the valve. Applying a depression to diaphragm chamber 34 is one means of so applying such force to the valve. Other means and arrangements of applying such a force to the valve may be used, and Figure 2 shows one such arrangement. Here the depression existing at port 44 above the throttle is applied, via passage 47 and connecting tube 71, to a small cylinder chamber 73 in which a piston 70 moves vertically, supported by a spring 75 whose compression is adjustable by adjustment of plug 72 on which the spring rests. Piston 70 supports the valve spring 38; so that by vertical movement of piston 70 the compression of spring 38 may be varied.

The compression of spring 75 will be adjusted so that, when the engine is not in operation and no depression exists in 73, piston 70 will be held up in some such position as illustrated in, or up against shoulder 70a, in which position spring 38 is adjusted in compression so as to cause the regulator to act to deliver a "normal" pressure in 22 something below atmospheric pressure; and thus the valve 20 again will be closed when the engine is not in operation. The exact pressure delivered at 22 may, of course, be adjusted by adjusting screw-threaded plug 72. When the engine goes into operation, depression from port 44 causes piston 70 to be moved downwardly; and the arrangement may be such that, at all times during engine operation, with the possible exception of throttle wide open and engine running slowly, piston 70 will be drawn down against its seat on plug 72 and thereby cause the gas delivery pressure in 22 to be raised by a fixed differential throughout all or most the range of engine operation. However, as in the form first described, it may be arranged that piston 70 is only drawn down on its seat during the low and medium, or even only during the low, ranges of engine operation; with the same final modifying results as hereinbefore described in connection with Figure 1. The times at which piston 70 will be drawn down on its seat depends upon several factors, including the relative compression strengths of springs 38 and 75, the amount of depression effectively applied to piston 70, and the size of the piston. Spring 75, of course, must be at least as strong as spring 38 in order to support the piston 70 under spring 38; the amount of depression effectively applied to the piston may be varied by the proper sizing of port 44 and by bleeding off or controlling the application of depression as in Figure 1, and piston 70 may of course be made of any suitable size. Thus, although, as in the form of Figure 1, the operation in Figure 2 may preferably be such that piston 70 is at substantially all ranges of operation drawn down against the limiting seat 72, and thus a uniform operating modification be applied to the regulator to raise the outlet pressure uniformly throughout substantially all ranges of engine operation, yet in this form as in that of Figure 1 the operation may be modified to effectively apply the rise in outlet pressure only to the lower ranges of engine operation.

The various forms and modifications hereinbefore described I deem to be not at all exhaustive of the changes and modifications that may be included within the scope of my invention; and I therefore wish it understood that the invention itself is not to be limited except as is expressly so stated in the following claims.

In the broader aspects of my invention as set out in the following claims, the regulator shown and described here is merely typical of any regulator that may be suitable for the purpose and wherein balancing forces applied to a regulator valve control the outlet pressure. And also the Venturi construction here illustrated and described is indicative of any equivalent structure operating by virtue of suction to draw in the gaseous fuel proportionately to the velocity and volume of air passing through the suction passage.

I claim:

1. In gas carbureting apparatus for engines, the combination comprising, a carbureter having a suction passage with an air intake and a gas intake, a gas and air mixture outlet and a throttle valve for controlling the flow of air through said passage; a gas pressure regulator operating to deliver gas to said carbureter gas intake normally at substantially constant pressure, said regulator including a gas pressure reducing valve, a pressure responsive valve operating means, and means placing said operating means in pressural communication with the gas stream at the outlet side of said valve; and means independent of said gas intake for communicating pressure in said suction passage to said valve operating means, whereby the latter is rendered responsive to pressure variations in the suction passage.

2. In gas carbureting apparatus for engines, the combination comprising, a carburetor having a suction passage with an air intake and a gas intake, a gas and air mixture outlet, and a throttle valve for controlling the flow of air through said passage; a gas pressure regulator operating to deliver gas to said carbureter gas intake normally at substantially constant pressure, said regulator including a gas pressure reducing valve, a pressure responsive valve operating means, and means placing said operating means in pressural communication with the gas stream at the outlet side of said valve; and means independent of said gas intake for modifying the operation of said regulator in accordance with pressure variations in said suction passage.

3. In gas carbureting apparatus for engines, the combination comprising, a carbureter having a suction passage with an air intake and a gas intake, a gas and air mixture outlet, and a throttle valve for controlling the flow of air through said passage; a gas pressure regulator operating to deliver gas to said carbureter gas intake normally at substantially constant pressure, said regulator including a gas pressure reducing valve, a pressure responsive valve operating means, and means placing said operating means in pressural communication with the gas stream at the outlet side of said valve; and means independent of said gas intake for modifying the operation of said regulator in accordance with movement of said throttle valve.

4. In gas carbureting apparatus for engines the combination comprising, a carbureter having therein a suction passage with an air intake, a Venturi throat and a throttle valve, and having a gas intake passage delivering at the Venturi throat; a gas pressure regulator adapted to take gas at an initially high pressure and deliver gas to the carburetor gas intake normally at a substantially constant sub-atmospheric pressure; said regulator including a gas pressure reducing valve, a valve operating diaphragm, and means placing said diaphragm in pressural communication with the gas stream at the outlet side of said valve; and means communicating depression from the suction passage at a point on the suction side of the throttle to that side of the diaphragm where lowered pressure causes opening of the valve.

5. In gas carbureting apparatus for engines the combination comprising, a carbureter having a suction passage with an air intake, a suction outlet, a throttle valve, means forming a gas intake port, and suction actuated means in the suction passage adapted to draw in gas in proportion to the volume of the air passing through the suction passage; pressure regulator means normally delivering at the gas intake port, gas at a constant pressure bearing a predetermined relation to the air pressure at the air inlet, said regulator comprising a gas pressure reducing valve, pressure responsive valve operating means, and means placing said operating means in pressural communication with the gas stream at the low pressure side of said valve; and means actuated by virtue of depression existent in the suction passage to modify the action of the pressure regulator and thereby to vary the gas pressure at the gas intake port.

6. In gas carbureting apparatus for engines the combination comprising, a carburetor having a suction passage with an air intake, a suction outlet, a throttle valve, means forming a gas intake port, and suction actuated means in the suction passage adapted to draw in gas in proportion to the volume of the air passing through the suction passage; pressure regulator means normally delivering at the gas intake port, gas at a constant pressure, means in said regulator whereby the gas is delivered to the intake port at a predetermined pressure below the air pressure at the air inlet, the last mentioned means comprising a gas pressure reducing valve, pressure responsive valve operating means, and means placing said operating means in pressural communication with the gas stream at the low pressure side of said valve; and means actuated by virtue of depression existent in the suction passage to modify the action of the pressure regulator to raise its delivery pressure.

7. In gas carbureting apparatus for engines the combination comprising, a carbureter having a suction passage with an air intake, a suction outlet, a throttle valve, means forming a gas intake port, and suction actuated means in the suction passage adapted to draw in gas in proportion to the volume of the air passing through the suction passage; a pressure regulator means normally delivering at the gas intake port, gas at a constant pressure a predetermined amount below the air pressure at the air inlet, said regulator comprising a gas pressure reducing valve, pressure responsive valve operating means, and means placing said operating means in pressural communication with the gas stream at the low pressure side of said valve; means actuated by virtue of depression existent in the suction passage to modify the action of the pressure regulator to raise its delivery pressure, and means limiting the pressure raising action of the last mentioned means.

8. In gas carbureting apparatus for engines the combination comprising, a carbureter having therein a suction passage with an air intake, a Venturi throat and a throttle valve, and having a gas intake passage delivering at the Venturi throat; a gas pressure regulator adapted to take gas at an initially high pressure and deliver gas to the carbureter gas intake normally at a lower regulated constant pressure, said regulator including a gas pressure regulating valve, a spring tending to close the valve, pressure responsive valve operating means, and means placing said operating means in pressural communication with the gas stream at the outlet side of said valve; and means communicating with the suction passage at the suction side of the throttle and applying to said valve a depression force from said point modifying the valve's pressure regulating movement.

9. In gas carbureting apparatus for engines the combination comprising, a carbureter having therein a suction passage with an air intake, a Venturi throat and a throttle valve, and having a gas intake passage delivering gas at the Venturi throat; a gas pressure regulator operating to take gas at an initially high pressure and to deliver gas to the carbureter gas intake normally at a constant sub-atmospheric pressure; said regulator including a pressure reducing valve and a valve operating diaphragm; and means applying a depression to one side of the diaphragm to open said pressure reducing valve, and valvular means limiting the amount of depression so applied to the diaphragm.

10. In gas carbureting apparatus for engines the combination comprising, a carbureter having therein a suction passage with an air intake, a Venturi throat and a throttle valve, and having a gas intake passage delivering at the Venturi throat; a gas pressure regulator operating to take gas at an initially high pressure and deliver gas to the carbureter gas intake normally at a constant sub-atmospheric pressure, said regulator including a high pressure inlet passage, a low pressure outlet passage, a regulator valve between the two passages, a diaphragm actuating the valve, and a passage communicating the outlet passage with one side of the diaphragm where pressure tends to close the valve; a relief valve in said communicating passage opening toward the diaphragm when subjected to a predetermined differential pressure, and means applying to said side of the diaphragm a depression from a point in the suction passage at the suction side of the throttle.

11. In gas carbureting apparatus for engines the combination comprising, a carbureter having therein a suction passage with an air intake, a Venturi throat and a throttle valve, and having a gas intake passage delivering at the Venturi throat; a gas pressure regulator adapted to take gas at an initially high pressure and deliver gas to the carbureter gas intake normally at a constant sub-atmospheric pressure, said regulator including a movable gas pressure regulating valve, a spring tending to close the valve, pressure responsive valve operating means, and means placing said operating means in pressural communication with the gas stream at the outlet side of said valve; and means applying to the valve spring a force depending on depression existing in the suction passage at a point at the suction side of the throttle, said force tending to lessen the effective spring pressure on the valve.

12. In gas carbureting apparatus for engines the combination comprising, a carbureter having therein a suction passage with an air intake, a Venturi throat and a throttle valve, and having a gas intake passage delivering at the Venturi throat; a gas pressure regulator adapted to take gas at an initially high pressure and deliver gas to the carbureter gas intake normally at a constant sub-atmospheric pressure, said regulator including a movable gas pressure regulating valve, a spring pressing against the valve to close it, pressure responsive valve operating means, and means placing said operating means in pressural communication with the gas stream at the outlet side of said valve; a movable pressure responsive member supporting said spring, and means applying to said member a depression from a point in the suction passage at the suction side of the throttle.

13. In gas carbureting apparatus for engines the combination comprising, a carbureter having therein a suction passage with an air intake, a Venturi throat and a throttle valve, and having a gas intake passage delivering at the Venturi throat; a gas pressure regulator adapted to take gas at an initially high pressure and deliver gas to the carbureter gas intake normally at a constant sub-atmospheric pressure, said regulator including a movable pressure regulating valve and a spring supporting it; a piston supporting said spring, another spring supporting the piston, and means applying to the under side of the piston depression from the suction passage at a point at the suction side of the throttle.

14. In gas carbureting apparatus for engines the combination comprising, a carbureter having therein a main suction passage with an air intake, a Venturi throat and a throttle valve, and having a gas intake passage delivering at the Venturi throat; a gas pressure regulator adapted to take gas at an initially high pressure and deliver gas to the carbureter gas intake at a constant relatively lower pressure, and including a moving gas pressure regulating valve, pressure responsive valve operating means, and means placing said operating means in pressural communication with the gas stream at the outlet side of said valve; and means communicating with the suction passage at a point slightly outside a closed throttle valve position and passed by the throttle valve in incipient opening, and applying a force to the pressure regulating valve to modify its movements in consonance with depression in the suction passage at said point.

15. In gas carbureting apparatus for engines the combination comprising, a carbureter having therein a main suction passage with an air intake, a Venturi throat and a throttle valve, and having a gas intake passage delivering at the Venturi throat; a gas pressure regulator adapted to take gas at an initially high pressure and deliver gas to the carbureter gas intake at a relatively lower constant pressure, the regulator including a movable pressure regulating valve, a diaphragm operatively connected to the valve, means exerting a predetermined force tending to close the regulator valve, there being a passage communicating the delivery pressure of the regulator to that side of the diaphragm where pressure tends to close the regulator valve; an atmospheric connection to the opposite side of the diaphragm; and means communicating with the suction passage at a point slightly outside a closed throttle valve position and passed by the throttle valve in incipient opening, and applying a force to the pressure regulating valve to modify its movements in consonance with depression in the suction passage at said point.

16. In gas carbureting apparatus for engines the combination comprising, a carbureter having therein a main suction passage with an air intake and an outlet, a Venturi throat and a throttle valve, and having a gas intake passage delivering at the Venturi throat; a gas pressure regulator adapted to take gas at an initially high pressure and deliver gas to the carbureter gas intake at a relatively lower constant pressure, the regulator including a movable pressure regulating valve, a diaphragm operatively connected to the valve, means exerting a predetermined force tending to close the regulator valve, there being a passage communicating the delivery pressure of the regulator to that side of the diaphragm where pressure tends to close the regulator valve; a connection communicating pressure in the carbureter air intake to the opposite side of the diaphragm; means communicating with the suction passage at a point in the suction passage at the outlet side of the throttle valve, and applying depression from that point to the first mentioned side of the diaphragm; and means communicating with the suction passage at a point in the suction passage slightly outside a closed throttle valve position and passed by the throttle valve in incipient opening, and applying depression from that point to said opposite side of the diaphragm.

17. In gas carbureting apparatus for engines the combination comprising, a carbureter having therein a main suction passage with an air intake, a Venturi throat and a throttle valve, and having a gas intake passage delivering at the Venturi throat; a gas pressure regulator adapted to take gas at an initially high pressure and deliver gas to the carbureter gas intake at a relatively lower constant pressure, the regulator including a movable pressure regulating valve, a diaphragm operatively connected to the valve, a valve spring tending to move the valve to closed position, there being a passage communicating the delivery pressure of the regulator to that side of the diaphragm where pressure tends to close the regulator valve; a connection communicating pressure in the carbureter air intake to the opposite side of the diaphragm, means communicating with the suction passage at a point on the suction side of the throttle valve, and applying a depression force from that point to said valve spring; and means communicating with the suction passage at a point slightly outside a closed throttle valve position and passed by the throttle valve in incipient movement and applying depression from that point to said opposite side of the diaphragm, said force and depressions modifying movements of the valve in consonance with the depressions at said points.

ROY F. ENSIGN.